US012116682B2

(12) United States Patent
Suzuki et al.

(10) Patent No.: US 12,116,682 B2
(45) Date of Patent: Oct. 15, 2024

(54) ELECTROLYZER, METHOD FOR CONTROLLING SAME, AND PROGRAM

(71) Applicant: ASAHI KASEI KABUSHIKI KAISHA, Tokyo (JP)

(72) Inventors: Yuto Suzuki, Tokyo (JP); Yasutaka Anami, Tokyo (JP); Koichi Hirata, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 500 days.

(21) Appl. No.: 17/599,906

(22) PCT Filed: Mar. 18, 2020

(86) PCT No.: PCT/JP2020/012107
§ 371 (c)(1),
(2) Date: Sep. 29, 2021

(87) PCT Pub. No.: WO2020/203319
PCT Pub. Date: Oct. 8, 2020

(65) Prior Publication Data

US 2022/0195613 A1 Jun. 23, 2022

(30) Foreign Application Priority Data

Apr. 1, 2019 (JP) ................................ 2019-069856

(51) Int. Cl.
*C25B 15/02* (2021.01)
*C25B 1/46* (2006.01)
(Continued)

(52) U.S. Cl.
CPC ................ *C25B 15/02* (2013.01); *C25B 1/46* (2013.01); *C25B 9/19* (2021.01); *C25B 9/60* (2021.01);
(Continued)

(58) Field of Classification Search
CPC ............. C25B 9/73–9/77; B01D 25/19–25/21
(Continued)

(56) References Cited

U.S. PATENT DOCUMENTS 3,233,733 A * 2/1966 Moss .................... B01D 35/18 210/231
4,479,426 A * 10/1984 Olenfalk ............... B01D 25/19 210/230
(Continued)

FOREIGN PATENT DOCUMENTS

CN 103384732 11/2013
GB 844208 A * 8/1960 ............ B01D 25/19
(Continued)

OTHER PUBLICATIONS

Supplementary European Search Report received in EP Application No. 20782684.3, dated May 11, 2022.
(Continued)

*Primary Examiner* — Harry D Wilkins, III
(74) *Attorney, Agent, or Firm* — GREENBLUM & BERNSTEIN, P.L.C.

(57) ABSTRACT

An electrolyzer stores of electrolytic cells, in which a pressing force applied to the stack is maintained by automatically adjusting the position of a locking mechanism of a safety device. The electrolyzer includes a stack obtained by stacking a plurality of electrolytic cells with membranes interposed therebetween, a pressing plate arranged on one end side in a stacking direction of the stack, an actuator which generates a pressing force along the stacking direction by moving the pressing plate, a safety device which is configured to maintain the pressing force by allowing the locking mechanism to come into contact with the contact plate to prevent the retraction of the pressing plate, when the actuator is not operated, and a control device which adjusts a distance between the locking mechanism and the contact
(Continued)

plate within a specific range so as to maintain the pressing force which acts on the stack.

18 Claims, 7 Drawing Sheets

(51) Int. Cl.

| | |
|---|---|
| ***C25B 9/19*** | (2021.01) |
| ***C25B 9/60*** | (2021.01) |
| ***C25B 9/73*** | (2021.01) |
| ***C25B 9/77*** | (2021.01) |
| ***F15B 15/26*** | (2006.01) |

(52) U.S. Cl.
CPC .................. *C25B 9/73* (2021.01); *C25B 9/77* (2021.01); *F15B 15/26* (2013.01)

(58) Field of Classification Search
USPC .................................................. 210/224–231
See application file for complete search history.

(56) References Cited

U.S. PATENT DOCUMENTS

| | | | |
|---|---|---|---|
| 4,756,817 | A | 7/1988 | Hicks |
| 5,006,215 | A | 4/1991 | Borrione et al. |
| 2016/0380298 | A1 | 12/2016 | Leah et al. |
| 2020/0063274 | A1 | 2/2020 | Funakawa et al. |

FOREIGN PATENT DOCUMENTS

| | | | |
|---|---|---|---|
| JP | 53-88667 | 8/1978 | |
| JP | 3-150385 | 6/1991 | |
| JP | 2000-355786 | 12/2000 | |
| JP | 2004-84006 | 3/2004 | |
| JP | 2012-55894 | 3/2012 | |
| JP | WO2012/114915 | 8/2012 | |
| JP | 2012-200626 | 10/2012 | |
| JP | 2015-124425 | 7/2015 | |
| JP | WO2018/168863 | 9/2018 | |
| JP | 6517835 | 5/2019 | |
| WO | WO 99/07455 A2 * | 2/1999 | ............ B01D 25/19 |
| WO | WO 2006/106463 A1 * | 10/2006 | ............ B01D 25/19 |

OTHER PUBLICATIONS

International Search Report issued in International Bureau of WIPO Patent Application No. PCT/JP2020/012107, dated Jun. 23, 2020, along with an English translation thereof.
International Preliminary Report on Patentability issued in International Bureau of WIPO Patent Application No. PCT/JP2020/012107, dated Sep. 28, 2021, along with an English translation thereof.

* cited by examiner

ELECTROLYZER, METHOD FOR CONTROLLING SAME, AND PROGRAM

TECHNICAL FIELD

The present invention relates to an electrolyzer, a method for controlling the same, and a program.

BACKGROUND ART

In order to perform electrolysis of an aqueous solution of alkali metal chloride such as a saline solution, or water (hereinafter referred to as "electrolysis"), there has heretofore been used an electrolyzer storing therein a stack in which a plurality of electrolytic cells are stacked. At present, a technique has been proposed in which the stack in the electrolyzer is pressurized in a stacking direction at a prescribed pressure by a pressurizing machine to suppress leakage of the contents (electrolytic solution, etc.) fled in the electrolytic cell (refer to, for example, Patent Document 1).

CITATION LIST

Patent Document

Patent Document 1: International Publication No. 2012/114915

SUMMARY

Technical Problem

By the way, in such a pressurizing machine as described in Patent Document 1, the pressing force is applied to the stack by moving a pressing plate by a hydraulic actuator or the like, but when the pressing force is released without operating the hydraulic actuator, a situation of retracting the pressing plate due to the expansion of the electrolytic cell or the like by a temperature change or the like occurs. In recent years, in preparation for such a situation, there has been adopted a technique that a safety device having a contact plate fixed at a predetermined position and a locking mechanism (including a lock nut) attached to a rod moving with the pressing plate is provided, and when the pressing plate is retracted to some extent, the locking mechanism is brought into contact with the contact plate to prevent the pressing plate from further retracting, thereby maintaining the pressing force.

However, in such a conventional safety device as described above, since the position of the locking mechanism cannot be automatically adjusted, it is necessary to perform the work of manually and periodically tightening the locking mechanism for the purpose of maintaining the pressing force, and the work is made complicated.

The present invention has been made in view of such circumstances, and it is an object of the present invention to provide an electrolyzer storing therein a stack obtained by stacking a plurality of electrolytic cells, in which a pressing force to be applied to the stack is maintained by automatically adjusting the position of a locking mechanism of a safety device.

Solution to Problem

In order to achieve the object, an electrolyzer according to the present invention includes a stack obtained by stacking a plurality of electrolytic cells each having an anode chamber and a cathode chamber with membranes interposed therebetween; a pressing plate arranged at least one end side in a stacking direction of the stack; an actuator which moves the pressing plate to thereby generate a pressing force along the stacking direction; a safety device which has a contact plate arranged at a predetermined position, a rod attached to the pressing plate so as to extend in the stacking direction and moving relative to the contact plate together with the pressing plate, and a locking mechanism attached to the rod, and is configured so that when the actuator does not operate, the locking mechanism comes into contact with the contact plate to prevent the rod and the pressing plate from retreating, thereby maintaining the pressing force; and a control device which adjusts a distance between the locking mechanism and the contact plate within a specific range so as to maintain the pressing force acting on the stack. Further, a method for producing an electrolysis product according to the present invention is a method for producing an electrolytic product by supplying a raw material to the present electrolyzer and performing electrolysis thereof.

Further, a control method according to the present invention is a method for controlling an electrolyzer including a stack obtained by stacking a plurality of electrolytic cells each having an anode chamber and a cathode chamber with membranes interposed therebetween, a pressing plate arranged at least one end side in a stacking direction of the stack, an actuator which moves the pressing plate to thereby generate a pressing force along the stacking direction, and a safety device which has a contact plate arranged at a predetermined position, a rod attached to the pressing plate so as to extend in the stacking direction and moving relative to the contact plate together with the pressing plate, and a locking mechanism attached to the rod, and is configured so that when the actuator does not operate, the locking mechanism comes into contact with the contact plate to prevent the rod and the pressing plate from retreating, thereby maintaining the pressing force. The control method includes a control step of causing a control device to adjust a distance between the locking mechanism and the contact plate within a specific range so as to maintain the pressing force acting on the stack.

In addition, a program according to the present invention is a program which causes a computer to execute a step group of controlling an electrolyzer including a stack obtained by stacking a plurality of electrolytic cells each having an anode chamber and a cathode chamber with membranes interposed therebetween, a pressing plate arranged at least one end side in a stacking direction of the stack, an actuator which moves the pressing plate to thereby generate a pressing force along the stacking direction, and a safety device which has a contact plate arranged at a predetermined position, a rod attached to the pressing plate so as to extend in the stacking direction and moving relative to the contact plate together with the pressing plate, and a locking mechanism attached to the rod, and is configured so that when the actuator does not operate, the locking mechanism comes into contact with the contact plate to prevent the rod and the pressing plate from retreating, thereby maintaining the pressing force. The step group includes a control step of causing a control device to adjust a distance between the locking mechanism and the contact plate within a specific range so as to maintain the pressing force acting on the stack.

With the adoption of such a configuration and method, when the actuator does not operate, the locking mechanism of the safety device comes into contact with the contact plate to prevent the rod and the pressing plate from retreating, so that the pressing force can be maintained. At this time, even when the electrolytic cell expands and contracts due to a temperature change or the like, the pressing force acting on the stack can be maintained at a predetermined value (for example, 10 $kg/cm^2$) or more by automatically adjusting the distance between the locking mechanism and the contact plate within a specific range by the control device. Thus, even in a state in which the actuator is not operated, an appropriate pressing force can be maintained without human intervention, and the leakage of liquid filled inside the electrolytic cell can be prevented. Incidentally, the locking mechanism may include a lock nut.

In the electrolyzer according to the present invention, the control device can adjust the position of the locking mechanism and/or the contact plate so as to maintain the pressing force acting on the stack at 10 $kg/cm^2$ or more. Further, in the control method (program) of the electrolyzer according to the present invention, in the control step, the control device can adjust the position of the locking mechanism and/or the contact plate so as to maintain the pressing force acting on the stack at 10 $kg/cm^2$ or more.

In the electrolyzer according to the present invention, the control device can adjust the position of the locking mechanism and/or the contact plate so as to maintain the distance between the locking mechanism and the contact plate at the maximum clearance $C_{MAX}$ or less per cell calculated in the following equation (1):

$$C_{MAX}\text{ (mm/cell)}=\text{seal surface pressure during electrolysis (kg/cm}^2)\times 0.011-0.108 \quad (1).$$

Further, in the control method (program) of the electrolyzer according to the present invention, in the control step, the control device can adjust the position of the locking mechanism and/or the contact plate so as to maintain the distance between the locking mechanism and the contact plate at the maximum clearance $C_{MAX}$ or less per cell calculated in the above equation (1).

In the electrolyzer according to the present invention, the control device can adjust the position of the locking mechanism and/or the contact plate so as to maintain the distance between the locking mechanism and the contact plate at 7 mm or less. Further, in the control method (program) of the electrolyzer according to the present invention, in the control step, the control device can adjust the position of the locking mechanism and/or the contact plate so as to maintain the distance between the locking mechanism and the contact plate at 7 mm or less.

In the electrolyzer according to the present invention, the control device can move the locking mechanism and/or the contact plate at a speed of 4.5 mm/h or more. Further, in the control method (program) of the electrolyzer according to the present invention, in the control step, the control device is capable of moving the locking mechanism and/or the contact plate at a speed of 4.5 mm/h or more.

The electrolyzer according to the present invention can further include a sensor which detects a change in the position of the locking mechanism with the movement of the pressing plate. In such a case, the control device can adjust the distance between the locking mechanism and the contact plate within a specific range so as to maintain the pressing force acting on the stack, based on the position change of the locking mechanism detected by the sensor. Further, in the control method (program) of the electrolyzer according to the present invention, a detection step of detecting a change in the position of the locking mechanism with the movement of the pressing plate by the sensor can be further included. In such a case, in the control step, the control device can adjust the distance between the locking mechanism and the contact plate within a specific range so as to maintain the pressing force acting on the stack, based on the position change of the locking mechanism detected in the detection step.

Advantageous Effects of Invention

According to the present invention, in an electrolyzer storing therein a stack obtained by stacking a plurality of electrolytic cells, a pressing force applied to the stack can be maintained by automatically adjusting the position of a locking mechanism of a safety device.

DESCRIPTION OF EMBODIMENTS

Hereinafter, embodiments of the present invention will be described with reference to the drawings. Incidentally, the following embodiments are merely suitable application examples, and the scope of application of the present invention is not limited to these.

Figure 1:
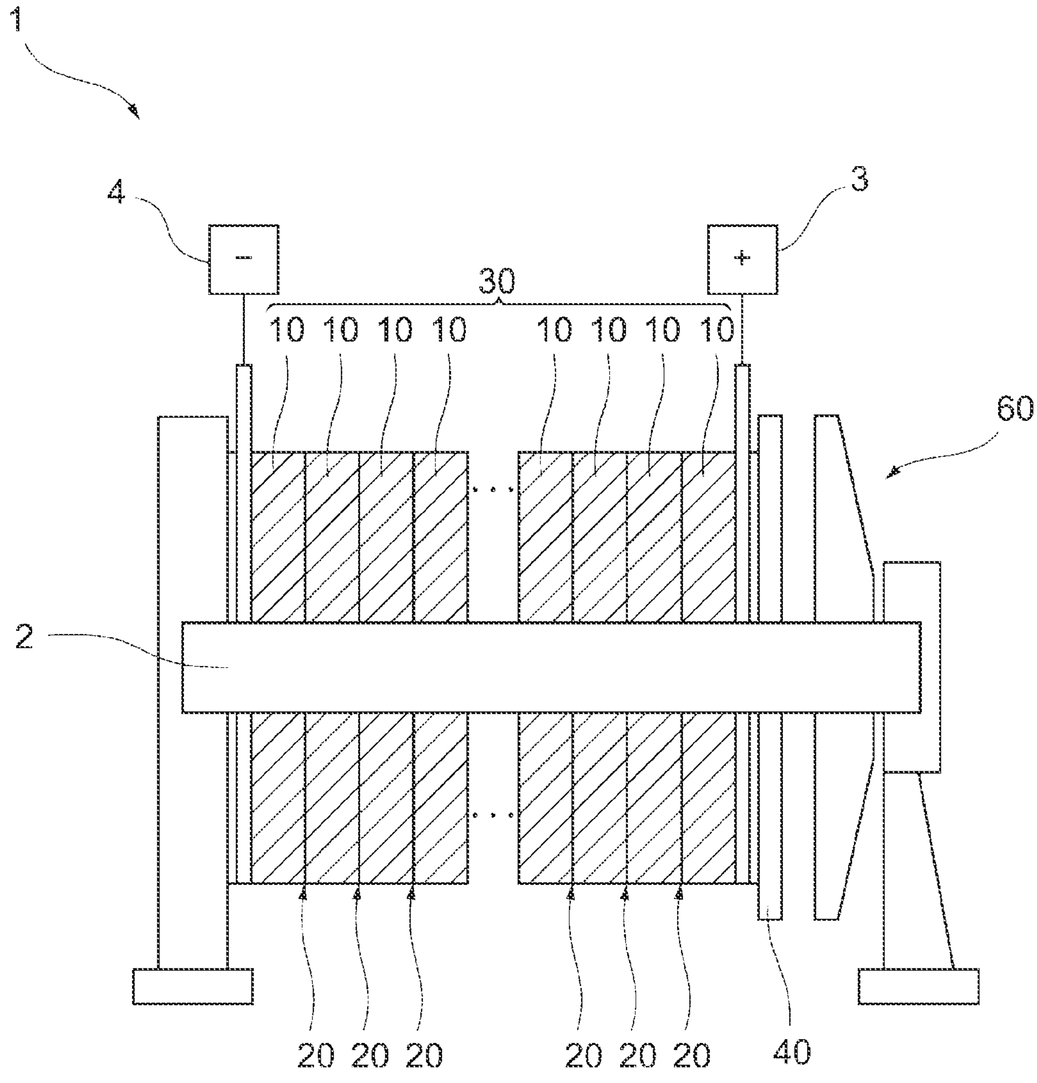
FIG. 1 is a simplified configuration diagram for describing a structure of an electrolyzer according to an embodiment of the present invention.

First, the structure of an electrolyzer 1 according to the embodiment of the present invention will be described using FIGS. 1 to 8. As shown in FIG. 1, the electrolyzer 1 according to the present embodiment includes a stack 30 obtained by stacking a plurality of electrolytic cells 10 with membranes 20 interposed therebetween.

Figure 3:
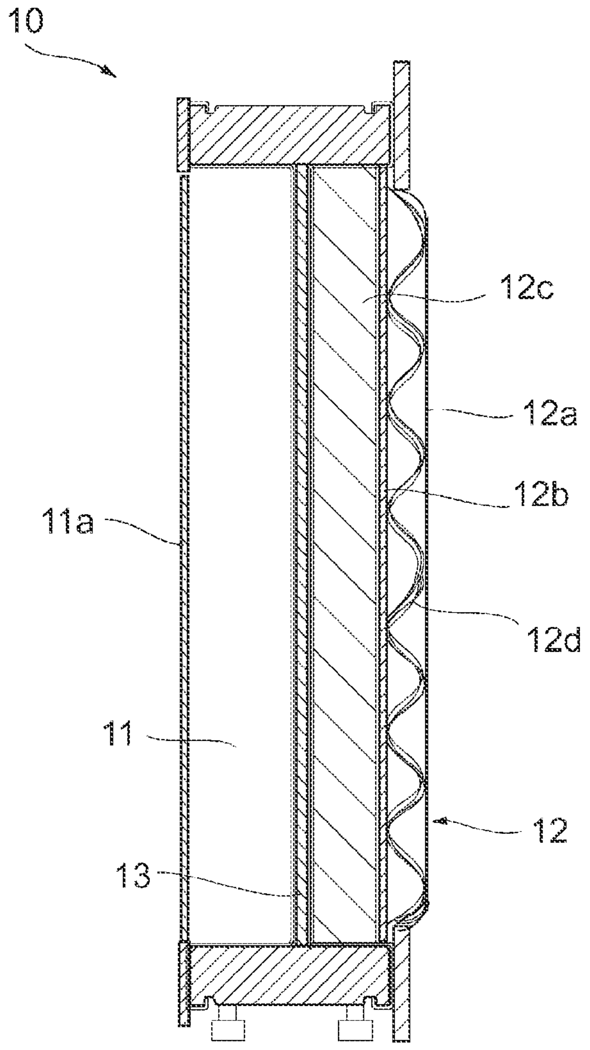
FIG. 3 is a cross-sectional view of an electrolytic cell of the electrolyzer according to the embodiment of the present invention.

As shown in FIG. 3, the electrolytic cells 10 constituting the stack 30 includes an anode chamber 11, a cathode chamber 12, a partition wall 13 installed between the anode chamber 11 and the cathode chamber 12, an anode 11*a* installed in the anode chamber 11, and a cathode 12*a* installed in the cathode chamber 12. The cathode chamber 12 further includes a current collector 12*b*, a support body 12*c* which supports the current collector 12*b*, and a metal elastic body 12*d*. The metal elastic body 12*d* is installed between the current collector 12*b* and the cathode 12*a*. The support body 12*c* is installed between the current collector 12*b* and the partition wall 13. The current collector 12*b* is electrically connected to the cathode 12*a* through the metal elastic body 12*d*. The partition wall 13 is electrically connected to the current collector 12*b* through the support body 12*c*. Accordingly, the partition wall 13, the support body 12*c*, the current collector 12*b*, the metal elastic body 12*d*, and the cathode 12*a* are electrically connected. The entire surface of the cathode 12*a* is preferably coated with a catalyst layer for reduction reaction. Further, the form of electrical connection may be in the form that the partition wall 13 and the support body 12*c*, the support body 12*c* and the current collector 12*b*, and the current collector 12*b* and the metal elastic body 12*d* are respectively directly attached, and the cathode 12*a* is laminated on the metal elastic body 12*d*. As a method of directly attaching the respective constituent members of these to each other, welding or the like can be mentioned.

Figure 4:
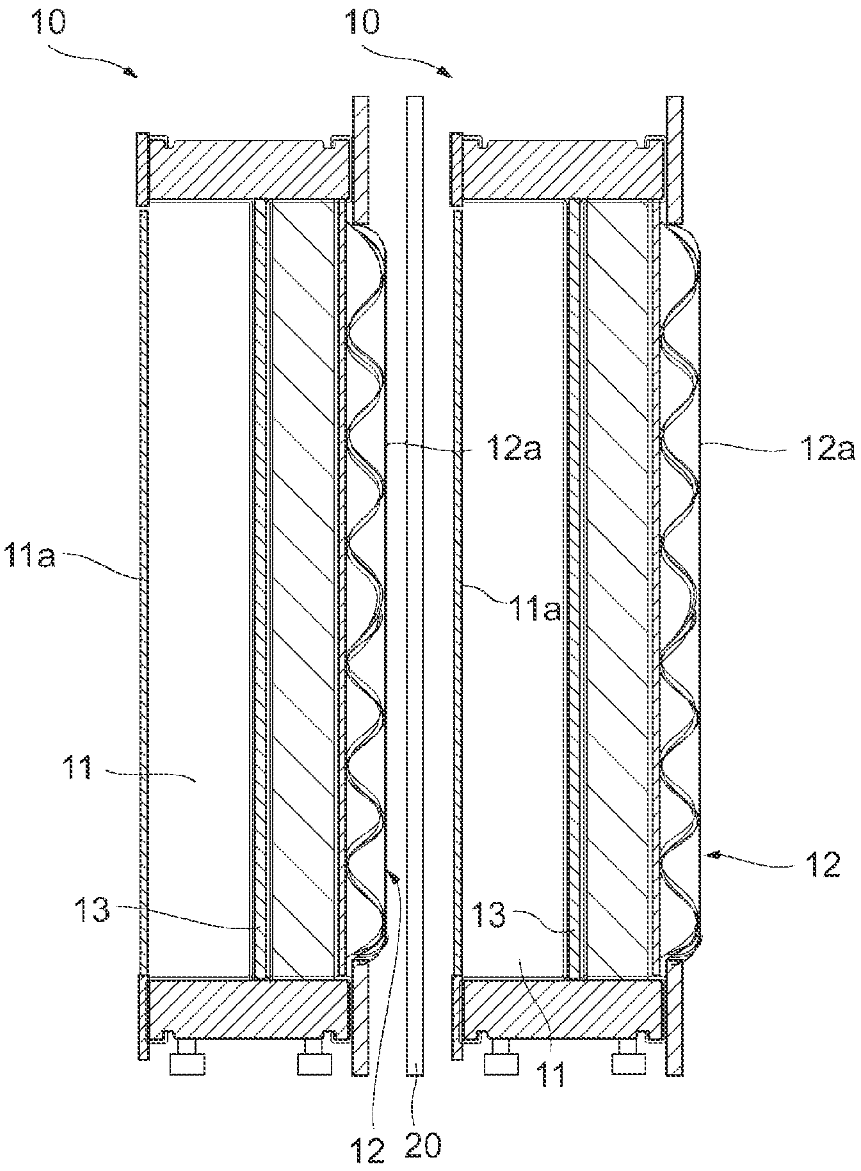
FIG. 4 is a cross-sectional view showing a state in which the two electrolytic cells shown in FIG. 3 are connected in series.

FIG. 4 is a cross-sectional view of the two adjacent electrolytic cells 10 in the electrolyzer 1. As shown in FIG. 4, the electrolytic cell 10, the membrane (ion exchange membrane) 20, and the electrolytic cell 10 are arranged in series in this order. The membrane 20 is arranged between the anode chamber 11 of one electrolytic cell 10 of the two electrolytic cells 10 adjacent in the electrolyzer 1 and the cathode chamber 12 of the other electrolytic cell 10 thereof in the electrolyzer 1. That is, the anode chamber 11 of the electrolytic cell 10 and the cathode chamber 12 of the electrolytic cell 10 adjacent thereto are separated by the membrane 20.

Figure 2:
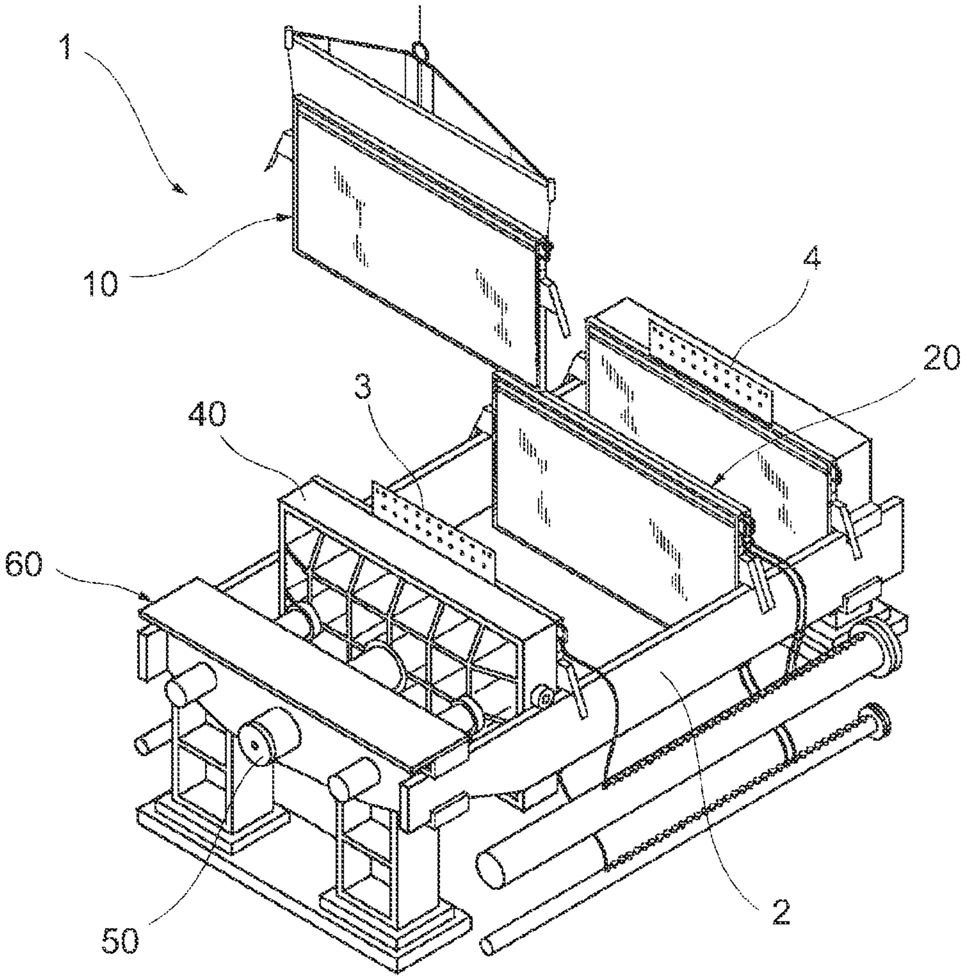
FIG. 2 is an exploded perspective view of the electrolyzer according to the embodiment of the present invention.

As shown in FIGS. 1 and 2, the electrolyzer 1 is configured in the form of the plurality of electrolytic cells 10 connected in series with the membranes 20 interposed therebetween being supported by an electrolyzer frame 2. That is, the electrolyzer 1 in the present embodiment is a multi-pole type electrolyzer including a plurality of electrolytic cells 10 arranged in series, membranes 20 each arranged between the adjacent electrolytic cells 10, and an electrolyzer frame 2 supporting them. As shown in FIG. 2, the electrolyzer 1 is assembled by arranging a plurality of electrolytic cells 10 in series with membranes 20 interposed therebetween and pressurizing and connecting them by a pressing plate 40 (to be described later) of a pressurizing machine. The configuration of the electrolyzer frame 2 is not particularly limited as long as it can support and connect each member, and various aspects can be adopted.

Further, as shown in FIGS. 1 and 2, the electrolyzer 1 includes an anode terminal 3 and a cathode terminal 4 connected to a power source. The anode 11*a* of the electrolytic cell 10 located at the extreme end of the plurality of electrolytic cells 10 connected in series in the electrolyzer 1 is electrically connected to the anode terminal 3. The cathode 12*a* of the electrolytic cell 10 located at the opposite end of the anode terminal 3, of the plurality of electrolytic cells 10 connected in series in the electrolyzer 1 is electrically connected to the cathode terminal 4. A current at the time of electrolysis flows from the anode terminal 3 side toward the cathode terminal 4 via the anode and cathode of each electrolytic cell 10. Incidentally, an electrolytic cell having only an anode chamber (anode terminal cell) and an electrolytic cell having only a cathode chamber (cathode terminal cell) may respectively be arranged at both ends of the connected electrolytic cells 10. In this case, the anode terminal 3 is connected to the anode terminal cell arranged at one end of the connected electrolytic cells, and the cathode terminal 4 is connected to the cathode terminal cell arranged at the other end thereof.

When electrolyzing salt water, salt water (raw material) is supplied to each anode chamber 11, and pure water or a low-concentration sodium hydroxide aqueous solution (raw material) is supplied to the cathode chamber 12. Each liquid is supplied to each electrolytic cell 10 from an unillustrated electrolytic solution supply pipe via an unillustrated electrolytic solution supply hose. Further, the electrolytic solution and the product obtained by electrolysis are recovered from an unillustrated electrolytic solution recovery tube. In electrolysis, sodium ions in salt water move from the anode chamber 11 of one electrolytic cell 10 to the cathode chamber 12 of the adjacent electrolytic cell 10 through the membrane 20. Thus, the current during electrolysis flows along the direction (stacking direction) in which the electrolytic cells 10 are connected in series. That is, the current flows from the anode chamber 11 to the cathode chamber 12 through the membrane 20. With the electrolysis of salt water, chlorine gas is generated on the anode 11*a* side, and sodium hydroxide (solute) and hydrogen gas are generated on the cathode 12*a* side. The generated chlorine gas, sodium hydroxide and hydrogen gas correspond to the electrolytic products in the present invention.

Figure 5:
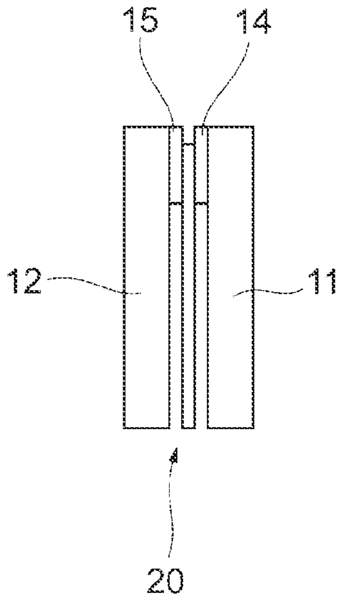
FIG. 5 is an explanatory view for describing gaskets arranged between the two electrolytic cells shown in FIG. 4.

Incidentally, in the present embodiment, as shown in FIG. 5, an anode side gasket 14 is arranged on the surface of a frame body constituting the anode chamber 11, and a cathode side gasket 15 is arranged on the surface of a frame body constituting the cathode chamber 12. The electrolytic cells 10 are connected to each other so that the anode side gasket 14 included in one electrolytic cell 10 and the cathode side gasket 15 of the electrolytic cell 10 adjacent thereto hold the membrane 20 therebetween. With these gaskets, when a plurality of electrolytic cells 10 are connected in series with the membranes 20 interposed therebetween, airtightness can be imparted to their connection points.

The gaskets 14 and 15 function to seal between the electrolytic cell 10 and the membrane 20. Specific examples of the gaskets 14 and 15 include a frame-like rubber sheet or the like having an opening formed in the center thereof. The gaskets 14 and 15 are required to have resistance to corrosive electrolytes, generated gases, and the like, and to be usable over a long period of time. Therefore, from the viewpoint of chemical resistance and hardness, vulcanized products of ethylene/propylene/diene rubber (EPDM rubber), vulcanized products of ethylene/propylene rubber (EPM rubber), peroxide cross-linked products, etc. are usually used as the gaskets 14 and 15. Also, when necessary, there can also be used a gasket in which a region in contact with liquid (contact portion) is coated with a fluorine resin such as polytetrafluoroethylene (PTFE) or tetrafluoroethylene/perfluoroalkyl vinyl ether copolymer (PFA). These gaskets 14 and 15 may respectively have an opening so as not to obstruct the flow of the electrolytic solution, and the shape of each gasket is not particularly limited. For example, the frame-like gaskets 14 and 15 are attached with an adhesive or the like along the peripheral edge of each opening of the anode chamber frames each constituting the anode chamber 11 or the cathode chamber frames each constituting the cathode chamber 12. Then, for example, when the two electrolytic cells 10 are connected with the membrane 20 interposed therebetween (refer to FIG. 4), each electrolytic cell 10 to which the gaskets 14 and 15 are attached may be tightened through the membrane 20. Consequently, it is possible to suppress the electrolytic solution and electrolytic products such as alkali metal hydroxide, chlorine gas, and hydrogen gas generated by electrolysis from leaking to the outside of the electrolytic cell 10.

Further, as shown in FIG. 2, the electrolyzer 1 according to the present embodiment includes the pressing plate 40 which applies a pressing force to the stack 30, and an actuator 50 which generates a pressing force along the stacking direction by moving the pressing plate 40. The pressing plate 40 is a part of the pressurizing machine. As shown in FIGS. 1 and 2, the pressing plate 40 is arranged on the anode terminal 3 side in the stacking direction of the stack 30 and fulfills the function of pressing the stack 30 toward the cathode terminal 4 side. The actuator 50 functions to generate the pressing force along the stacking direction by moving the pressing plate 40. In the present embodiment, a hydraulic cylinder operated by hydraulic pressure is adopted as the actuator 50.

Figure 6:
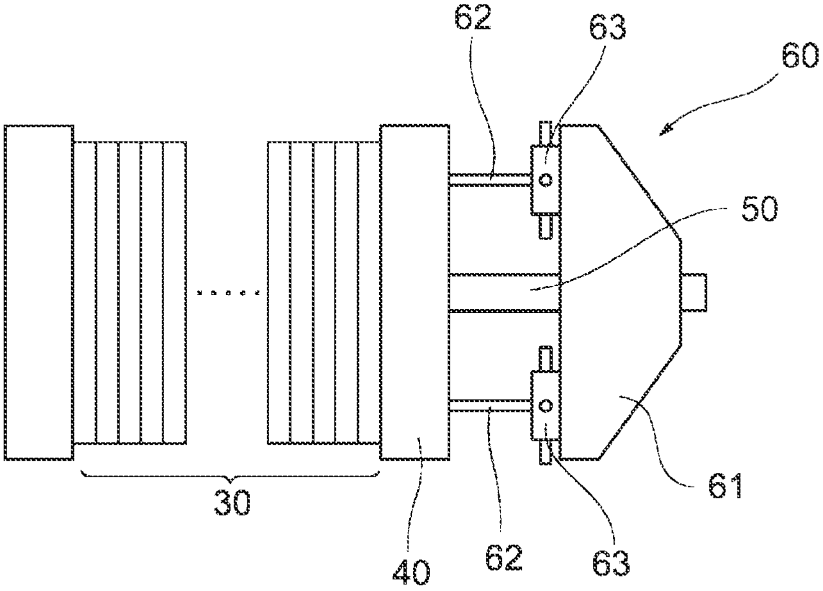
FIG. 6 is an explanatory view for describing a structure of a safety device of the electrolyzer according to the embodiment of the present invention.

In addition, as shown in FIG. 6, the electrolyzer 1 according to the present embodiment includes a safety device 60 configured to maintain the pressing force acting on the stack 30 when the actuator 50 does not operate. The safety device 60 has a contact plate 61 arranged (fixed) at a predetermined position, a rod 62 which is attached to the pressing plate 40 so as to extend in the stacking direction of the stack 30, and moves relatively to the contact plate 61 together with the pressing plate 40, and a locking mechanism 63 attached to the rod 62. During the normal operation of the electrolyzer 1, a predetermined pressing force can be applied to the stack 30 by the pressing plate 40 by operating the actuator 50. On the other hand, when the actuator 50 does not operate due to the fact that no power source is supplied to the actuator 50, or the like, a situation may occur in which the pressing plate 40 retracts due to the expansion of the electrolytic cell 10 by a temperature change or the like. However, even if such a situation occurs, as shown in FIG. 6, the locking mechanism 63 of the safety device 60 comes into contact with the contact plate 61 to prevent the rod 62 and the pressing plate 40 from retreating. It thus becomes possible to maintain the pressing force acting on the stack 30. The locking mechanism 63 has a lock nut and the like.

Here, when the electrolytic cell 10 contracts due to a temperature change or the like, the pressing plate 40, the rod 62, and the locking mechanism 63 move in the direction opposite to the contact plate 61, and thereby a gap may occur between the locking mechanism 63 and the contact plate 61. In such a situation, the pressing force acting on the stack 30 when the actuator 50 is not operated may decrease, and the leakage of the electrolytic solution or the electrolytic product may occur. In order to prevent such a situation, conventionally, an operator has periodically performed the work of tightening the locking mechanism 63 and moving it to the contact plate 61 side. However, since such work is complicated, a technique of automatically tightening the locking mechanism 63 (automatically adjusting the position of the locking mechanism 63) has been desired.

Figure 7:
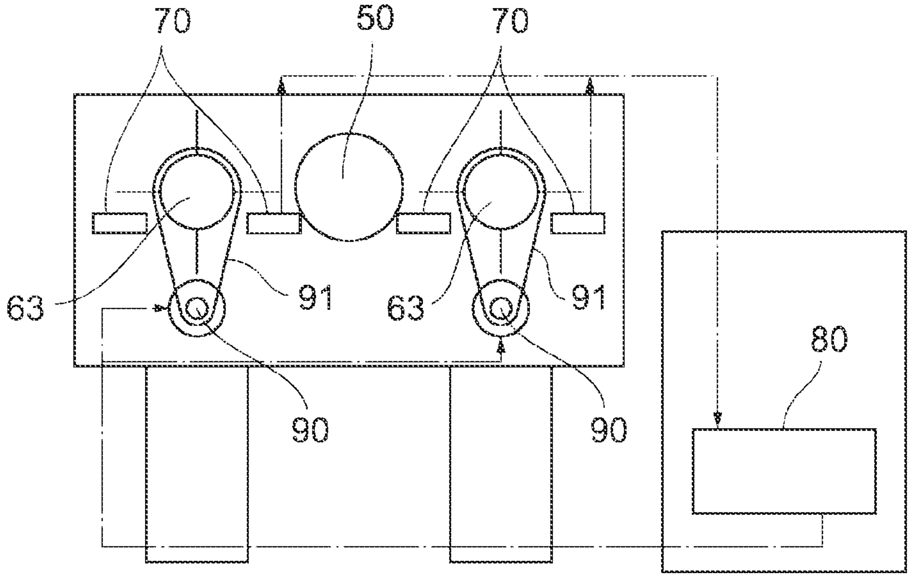
FIG. 7 is an explanatory view for describing a structure of a control device or the like of the electrolyzer according to the embodiment of the present invention.

Therefore, the electrolyzer 1 according to the present embodiment is provided with a mechanism of automatically adjusting the position of the locking mechanism 63 of the safety device 60. That is, as shown in FIG. 7, the electrolyzer 1 includes a sensor 70 which detects a change in the position of the locking mechanism 63 with the movement of the pressing plate 40, and a control device 80 which adjusts the position of the locking mechanism 63 so as to maintain the pressing force acting on the stack 30, based on the position change of the locking mechanism 63 detected in the sensor 70. At this time, in order to maintain the pressing force acting on the stack 30, there is a need to adjust the distance between the locking mechanism 63 and the contact plate 61 within a specific range. Incidentally, not only the positional adjustment of the locking mechanism 63, but also the distance between the locking mechanism 63 and the contact plate 61 may be adjusted based on a change in the position of stroke of the pressing plate 40, the specific cell or the actuator.

The sensor 70 can adopt, for example, a configuration having a pair of light emitting and light receiving elements arranged so as to sandwich the locking mechanism 63, and in which a change in the position of the locking mechanism 63 is detected by receiving light emitted from the light emitting element toward the locking mechanism 63 by the light receiving element. However, the sensor is not particularly limited to such a configuration. Any configuration which can detect the position change of the locking mechanism 63 may be adopted.

The control device 80 includes a computer having a memory, a CPU, and the like for recording various programs and various data. The control device 80 in the present embodiment functions to receive information about the position change of the locking mechanism 63 sent from the sensor 70, generate a control signal based on the received information, output the control signal to a motor 90, and drive the motor 90 to move the lock nut 63 with respect to the rod 62 via a chain 91 to adjust the position of the locking mechanism 63, thereby to maintain the pressing force acting on the stack 30.

The control device 80 in the present embodiment adjusts the position of the locking mechanism 63 so as to maintain the pressing force acting on the stack 30 at 10 kg/cm$^2$ or more. Further, the control device 80 according to the present embodiment adjusts the position of the locking mechanism 63 so as to maintain the distance between the locking mechanism 63 and the contact plate 61 at $C_{MAX}$ (maximum clearance per cell) calculated in the following equation (1):

$$C_{MAX}\text{ (mm/cell)}=\text{seal surface pressure during electrolysis (kg/cm}^2\text{)}\times 0.011-0.108 \quad (1)$$

Figure 8:
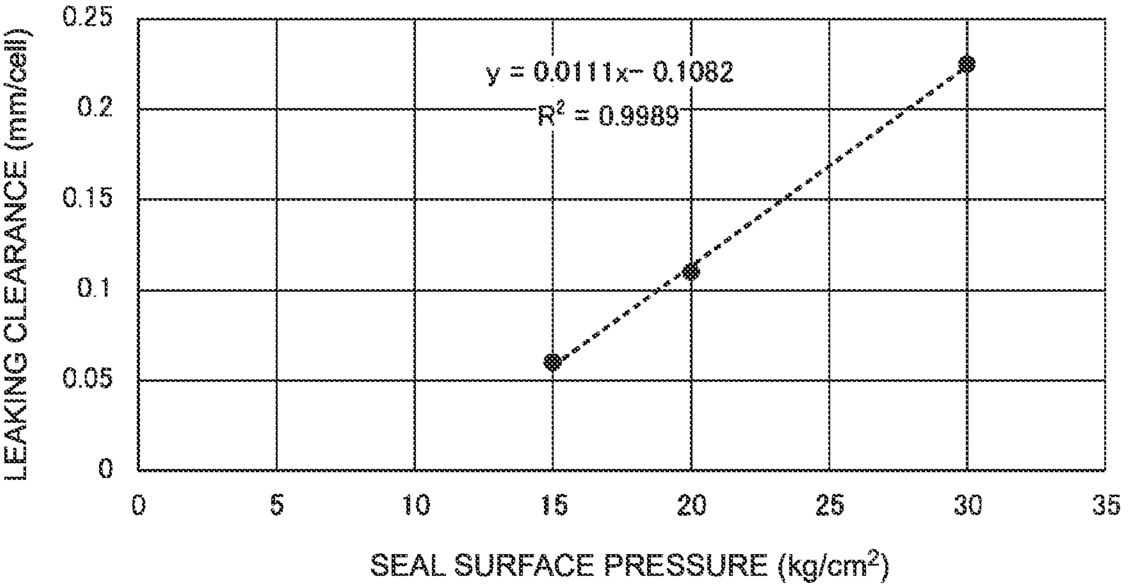
FIG. 8 is a graph showing the correlation between seal surface pressure at the time of electrolysis and the maximum clearance per cell.

The graph of FIG. 8 is a graph showing the correlation between the sealing surface pressure (kg/cm$^2$) during electrolysis and the maximum clearance (leaking clearance) (mm/cell) per cell. The graph is a plot of measurement results when the seal surface pressure is taken on the horizontal axis (x-axis) and the maximum clearance per cell is taken on the vertical axis (y-axis) respectively. The equation (1) corresponds to an approximate equation calculated based on the graph of FIG. 8.

Further, the control device 80 preferably adjusts the position of the locking mechanism 63 so that the distance between the locking mechanism 63 and the contact plate 61 is maintained at 7 mm or less, based on the position change of the locking mechanism 63 detected by the sensor 70. As the distance between the locking mechanism 63 and the contact plate 61 increases, the thickness of each of the gaskets 14 and 15 (refer to FIG. 5) when the actuator is not operated increases, and the seal pressure decreases, so that there is a possibility that the liquid filled inside the electrolytic cell 10 may leak. However, according to the experiments of the inventors of the present application, it has been clarified that by maintaining the distance between the locking mechanism 63 and the contact plate 61 at 7 mm or less, the pressing force acting on the stack 30 can be maintained at 10 kg/cm$^2$ or more, and the leakage of the liquid filled inside the electrolytic cell 10 can be prevented.

Incidentally, in the present embodiment, the minimum value of the pressing force acting on the stack 30 is set to "10 kg/cm$^2$", but the maximum value of the pressing force acting on the stack 30 can be set as appropriate (for example, about 70 kg/cm$^2$) in consideration of the scale and specifications of the electrolyzer 1, the specifications of the gaskets 14 and

15, the period of their use, and the like. Further, the control device 80 in the present embodiment functions to move the locking mechanism 63 at a speed of 4.5 mm/h or more in consideration of the speed of creep of the gaskets 14 and 15 (indicating that the thickness gradually decreases due to the pressing force), etc.

Figure 9:
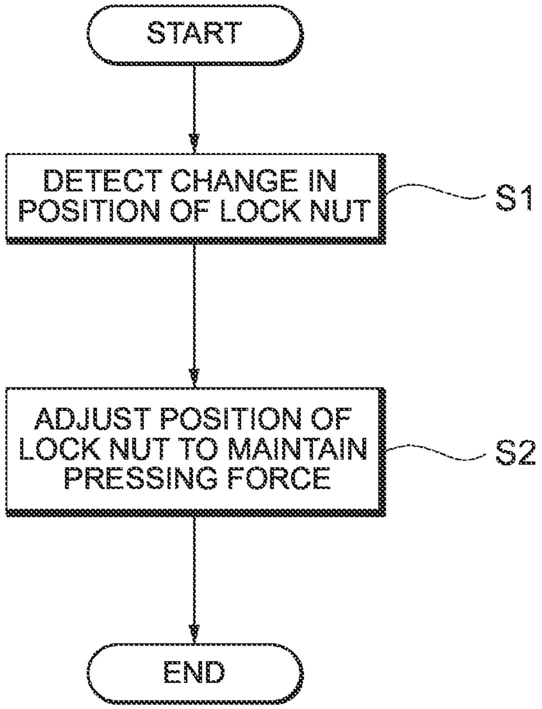
FIG. 9 is a flowchart for describing a control method of the electrolyzer according to the embodiment of the present invention.

Next, a control method of the electrolyzer 1 according to the present embodiment will be described using a flowchart of FIG. 9.

The operator maintains the operating states of the safety device 60, the sensor 70, and the control device 80 even when the operation of the actuator 50 of the electrolyzer 1 is stopped. Then, the sensor 70 detects a change in the position of the locking mechanism 63 with the movement of the pressing plate 40 due to the temperature change or the like (detection step: S1). Next, the control device 80 adjusts the position of the locking mechanism 63 so as to maintain the pressing force acting on the stack 30, based on the position change of the locking mechanism 63 detected in the detection step S1 (control step: S2). In the control step S2, the control device 80 moves the locking mechanism 63 at a speed of 4.5 mm/h or more.

For example, the distance between the locking mechanism 63 and the contact plate 61 at the time when the operation of the actuator 50 is stopped has been taken to be 10 mm. While on the contrary, when the sensor 70 detects that as a result of movement of the locking mechanism 63 to the contact plate 61 side by 4 mm due to the expansion of the electrolytic cell 10, the distance between the locking mechanism 63 and the contact plate 61 has reached 6 mm, the control device 80 determines that the movement of the locking mechanism 63 becomes unnecessary where the distance between the locking mechanism 63 and the contact plate 61 is the maximum clearance $C_{MAX}$ or less shown in the equation (1), and the control device 80 does not adjust the position of the locking mechanism 63. On the other hand, thereafter, when the sensor 70 detects that as a result of movement of the locking mechanism 63 by 3 mm in the direction opposite to the contact plate 61 due to the contraction of the electrolytic cell 10, the distance between the locking mechanism 63 and the contact plate 61 has reached the maximum clearance $C_{MAX}$ or more, the control device 80 moves the locking mechanism 63 to the contact plate 61 side until the distance between the locking mechanism 63 and the contact plate 61 becomes the maximum clearance $C_{MAX}$ or less, to maintain the pressing force acting on the stack 30 at 10 kg/cm$^2$ or more.

Incidentally, even when the distance between the locking mechanism 63 and the contact plate 61 is the maximum clearance $C_{MAX}$ or less, the control device 80 can also adjust the position of the locking mechanism 63 so as to maintain the pressing force acting on the stack 30 at 10 kg/cm$^2$ or more. That is, a target value (target distance) of the distance between the locking mechanism 63 and the contact plate 61 is set within the range of 0 to $C_{MAX}$, and the control device 80 can adjust the position of the locking mechanism 63 so that the actual distance becomes the target distance. For example, when the target value (target distance) of the distance between the locking mechanism 63 and the contact plate 61 is set to 4 mm, and the distance detected by the sensor 70 is 3.5 mm, the control device 80 outputs such a control signal as to increase the distance between the lock nut 63 and the contact plate 61 by 0.5 mm to the motor 90 to enable the locking mechanism 63 to move.

In the electrolyzer 1 according to the embodiment described above, when the actuator 50 does not operate, the locking mechanism 63 of the safety device 60 comes into contact with the contact plate 61 to prevent the rod 62 and the pressing plate 40 from retreating, thereby making it possible to maintain the pressing force. At this time, even when the electrolytic cell 10 expands and contracts due to the temperature change or the like, the control device 80 automatically adjusts the position of the locking mechanism 63 to thereby enable the pressing force acting on the stack 30 to be maintained at a predetermined value (10 kg/cm$^2$) or more. Accordingly, even in a state in which the actuator 50 does not operate, an appropriate pressing force can be maintained without human intervention, and the leakage of the liquid filled inside the electrolytic cell 10 can be prevented.

Incidentally, in the above embodiment, although there is shown the example in which while the contact plate 61 of the safety device 60 is fixed to the predetermined position, the locking mechanism 63" is moved to thereby maintain the pressing force acting on the stack 30, the "contact plate 61" is configured to be movable, and the position of the "contact plate 61" is adjusted instead of the movement of the locking mechanism 63 (or in addition to moving the locking mechanism 63), whereby the pressing force acting on the stack 30 can also be maintained.

The present invention is not limited to the above embodiment, and those obtained by appropriately design-changing such an embodiment by those skilled in the art are also included in the scope of the present invention as long as they have the features of the present invention. That is, each element included in the embodiment and its arrangement, material, condition, shape, size, etc. are not limited to those exemplified, and can be changed as appropriate. Further, the respective elements included in the embodiment can be combined as much as technically possible, and the combination thereof is also included in the scope of the present invention as long as the features of the present invention are included.

REFERENCE SIGNS LIST

- 1 . . . electrolyzer
- 10 . . . electrolytic cell
- 11 . . . anode chamber
- 12 . . . cathode chamber
- 20 . . . membrane
- 30 . . . stack
- 40 . . . pressing plate
- 50 . . . actuator
- 60 . . . safety device
- 61 . . . contact plate
- 62 . . . rod
- 63 . . . locking mechanism
- 70 . . . sensor
- 80 . . . control device
- S1 . . . detection step
- S2 . . . control step.

What is claimed is:

1. An electrolyzer comprising:

a stack obtained by stacking a plurality of electrolytic cells each having an anode chamber and a cathode chamber with membranes interposed therebetween;

a pressing plate arranged at least one end side in a stacking direction of the stack;

an actuator which moves the pressing plate to thereby generate a pressing force along the stacking direction;

a safety device which has: a contact plate arranged at a predetermined position; a rod attached to the pressing plate so as to extend in the stacking direction and moving relative to the contact plate together with the pressing plate; and a locking mechanism attached to the rod, and is configured so that when the actuator does not operate, the locking mechanism comes into contact with the contact plate to prevent the rod and the pressing plate from retreating, thereby maintaining the pressing force; and a control device which adjusts a distance between the locking mechanism and the contact plate within a specific range so as to maintain the pressing force acting on the stack.

2. The electrolyzer according to claim 1, wherein the control device adjusts the position of the locking mechanism and/or the contact plate so as to maintain the pressing force acting on the stack at 10 $kg/cm^2$ or more.

3. The electrolyzer according to claim 1, wherein the control device adjusts the position of the locking mechanism and/or the contact plate so as to maintain the distance between the locking mechanism and the contact plate at the maximum clearance $C_{MAX}$ or less per cell calculated in the following equation (1):

$$C_{MAX}\ (\text{mm/cell}) = \text{seal surface pressure during electrolysis}\ (\text{kg/cm}^2) \times 0.011 - 0.108 \quad (1).$$

4. The electrolyzer according to claim 1, wherein the control device adjusts the position of the locking mechanism and/or the contact plate so as to maintain the distance between the locking mechanism and the contact plate at 7 mm or less.

5. The electrolyzer according to claim 1, wherein the control device moves the locking mechanism and/or the contact plate at a speed of 4.5 mm/h or more.

6. A method for producing an electrolytic product by supplying a raw material to the electrolyzer according to claim 1 and electrolyzing the same.

7. A method for controlling an electrolyzer including:

a stack obtained by stacking a plurality of electrolytic cells each having an anode chamber and a cathode chamber with membranes interposed therebetween, a pressing plate arranged at least one end side in a stacking direction of the stack, an actuator which moves the pressing plate to thereby generate a pressing force along the stacking direction, and a safety device which has: a contact plate arranged at a predetermined position; a rod attached to the pressing plate so as to extend in the stacking direction and moving relative to the contact plate together with the pressing plate; and a locking mechanism attached to the rod, and is configured so that when the actuator does not operate, the locking mechanism comes into contact with the contact plate to prevent the rod and the pressing plate from retreating, thereby maintaining the pressing force, the method comprising:

causing a control device to adjust a distance between the locking mechanism and the contact plate within a specific range so as to maintain the pressing force acting on the stack.

8. The method for controlling the electrolyzer according to claim 7, wherein the control device adjusts the position of the locking mechanism and/or the contact plate so as to maintain the pressing force acting on the stack at 10 $kg/cm^2$ or more.

9. The method for controlling the electrolyzer according to claim 7, wherein the control device adjusts the position of the locking mechanism and/or the contact plate so as to maintain the distance between the locking mechanism and the contact plate at the maximum clearance $C_{MAX}$ or less per cell calculated in the following equation (1):

$$C_{MAX}\ (\text{mm/cell}) = \text{seal surface pressure during electrolysis}\ (\text{kg/cm}^2) \times 0.011 - 0.108 \quad (1).$$

10. The method for controlling the electrolyzer according to claim 7, wherein the control device adjusts the position of the locking mechanism and/or the contact plate so as to maintain the distance between the locking mechanism and the contact plate at 7 mm or less.

11. The method for controlling the electrolyzer according to claim 7, wherein the control device moves the locking mechanism and/or the contact plate at a speed of 4.5 mm/h or more.

12. A non-transitory recording medium having recorded thereon a program which causes a computer to execute a control of an electrolyzer including:

a stack obtained by stacking a plurality of electrolytic cells each having an anode chamber and a cathode chamber with membranes interposed therebetween, a pressing plate arranged at least one end side in a stacking direction of the stack, an actuator which moves the pressing plate to thereby generate a pressing force along the stacking direction, and a safety device which has: a contact plate arranged at a predetermined position; a rod attached to the pressing plate so as to extend in the stacking direction and moving relative to the contact plate together with the pressing plate; and a locking mechanism attached to the rod, and is configured so that when the actuator does not operate, the locking mechanism comes into contact with the contact plate to prevent the rod and the pressing plate from retreating, thereby maintaining the pressing force, wherein the control causing a control device to adjust a distance between the locking mechanism and the contact plate within a specific range so as to maintain the pressing force acting on the stack.

13. The non-transitory recording medium according to claim 12, wherein the control device adjusts the position of the locking mechanism and/or the contact plate so as to maintain the pressing force acting on the stack at 10 $kg/cm^2$ or more.

14. The non-transitory recording medium according to claim 12, wherein the control device adjusts the position of the locking mechanism and/or the contact plate so as to maintain the distance between the locking mechanism and the contact plate at the maximum clearance $C_{MAX}$ or less per cell calculated in the following equation (1):

$$C_{MAX}\ (\text{mm/cell}) = \text{seal surface pressure during electrolysis}\ (\text{kg/cm}^2) \times 0.011 - 0.108 \quad (1).$$

15. The non-transitory recording medium according to claim 12, wherein the control device adjusts the position of the locking mechanism and/or the contact plate so as to maintain the distance between the locking mechanism and the contact plate at 7 mm or less.

16. The non-transitory recording medium according to claim 12, wherein the control device moves the locking mechanism and/or the contact plate at a speed of 4.5 mm/h or more.

17. The non-transitory recording medium according to claim 12, wherein the locking mechanism includes a lock nut.

18. The non-transitory recording medium according to claim 12, further including detecting a change in the position of the locking mechanism with the movement of the pressing plate by a sensor, wherein the control device adjusts the distance between the locking mechanism and the contact plate within a specific range so as to maintain the pressing force acting on the stack, based on the position change of the locking mechanism detected.

* * * * *